Aug. 7, 1934.  V. FOCH  1,969,601

POTATO RACK

Filed Oct. 4, 1933

Victor Foch,
INVENTOR

WITNESS:

Patented Aug. 7, 1934

1,969,601

UNITED STATES PATENT OFFICE 1,969,601

POTATO RACK

Victor Foch, San Diego, Calif.

Application October 4, 1933, Serial No. 692,169

1 Claim. (Cl. 53—6)

The invention relates to a potato rack or baker.

The primary object of the invention is the provision of a device of this character, wherein a number of potatoes can be supported in group for the placing thereof within an oven to permit the baking of the same, the holder for the potatoes being of novel form so that it can be readily carried and placed within the oven of a stove.

Another object of the invention is the provision of a device of this character, wherein each potato to be baked is placed upon a tine or prong and after baking, such potato can be readily removed and the device cleaned or washed, thereby rendering the same thoroughly sanitary.

A further object of the invention is the provision of a device of this character, wherein a frame is made from wire lengths and carries a plurality of tines or prongs, these constituting anchoring pins for potatoes so that a group thereof as placed upon the frame may be conveniently introduced into the oven of a stove for the baking of the potatoes. The potatoes when carried as stated will be exposed to the heat throughout their extent and in this fashion enabling quick baking of the same, thus avoiding the manual handling of each potato as is customary for the baking of the same in the stove oven.

A still further object of the invention is the provision of a device of this character, which is simple in construction, thoroughly reliable and efficient in its use, strong, durable, yet light of weight, and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention, and pointed out in the claims hereunto appended.

In the accompanying drawing:—

Similar reference characters indicate corresponding parts throughout the several views in the drawing.

Figure 1:
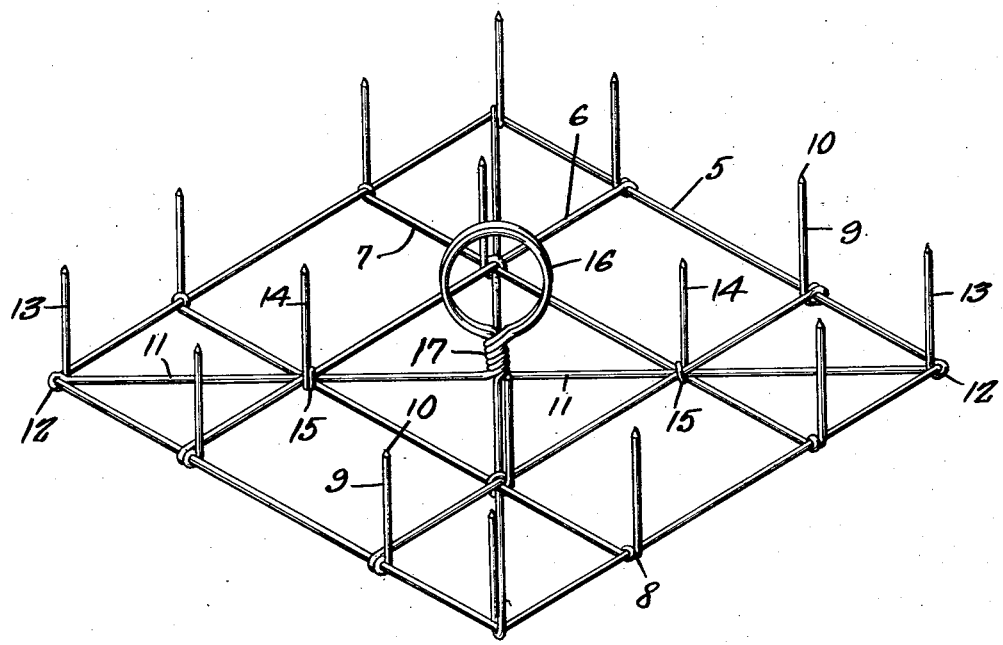
Figure 1 is a perspective view of a device constructed in accordance with the invention.

Referring to the drawing in detail, the device comprises a frame 5 formed from a single length of wire bent on itself into the required shape for the said frame 5. Disposed at intervals of this frame 5 are transversely disposed spaced wires 6 and 7 respectively, these crossing each other and are formed with coils 8 embracing the frame, while the ends of said wires are extended upwardly to provide upstanding ears 9 having points 10. Additionally, the frame 5 is augmented with diagonal wires 11, these having the coils 12 embracing the frame and the upstanding pins 13.

At the crossing points of the wires 6, 7 and 11 removed from the center of the frame are upstanding pins 14 having the coils 15 embracing such wires at the crossing point.

Centrally of the frame is arranged a finger ring or handle 16 having the twisted stem 17 joined with the diagonally disposed wires 11 at the center crossing thereof. It is of course to be understood that the coils of the wires embracing the frame 5 may be soldered or otherwise made secure and likewise the stem 17 may be so secured to the diagonal crossed wires 11.

Figure 2:
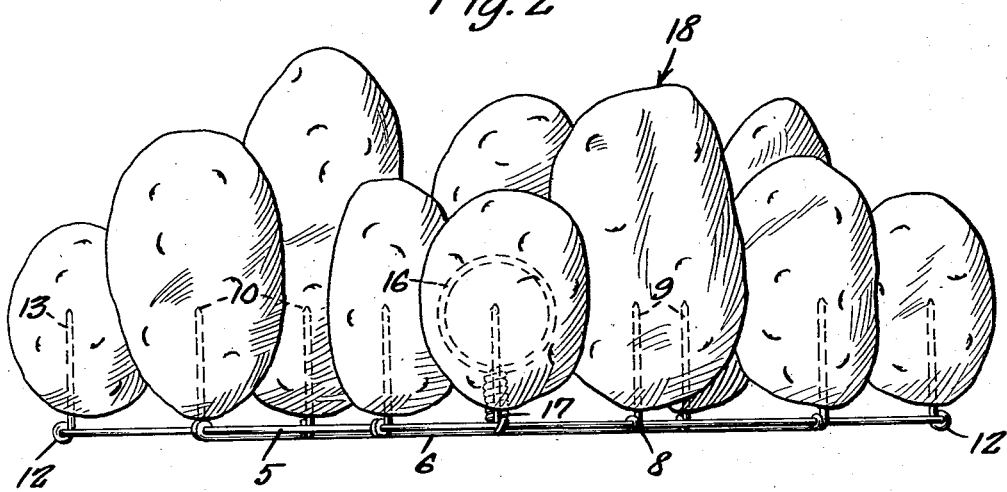
Figure 2 is a side elevation showing a group of potatoes carried by the device.

In the use of the device potatoes 18 are engaged upon the pins 9, 13 and 14 by having the latter penetrate said potatoes and in this manner these will be held as shown in Figure 2 of the drawing and thus the group of said potatoes 18 can be conveniently placed within the oven of a stove for the baking thereof. Upon the baking of the potatoes 18 the same can be readily and conveniently removed with dispatch from the pins on the frame 5 of the device. The use of the device should be clearly obvious and therefore a more extended explanation has been omitted.

What is claimed is:—

A device of the character described comprising a frame having crossed wires fixed thereto, pins upstanding from the frame, and a handle centrally located on the frame, the said pins being joined with the crossed wires through the medium of coils embracing the frame and the crossing points of the crossed wires.

VICTOR FOCH.